US008345726B1

(12) United States Patent
Haendel et al.

(10) Patent No.: US 8,345,726 B1
(45) Date of Patent: Jan. 1, 2013

(54) ARCHITECTURE FOR RECEIVING DATA FROM A MULTIPLICITY OF FREQUENCY HOPPING EMITTERS

(75) Inventors: Richard S. Haendel, Iowa City, IA (US); Scott J. Zogg, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1568 days.

(21) Appl. No.: 10/616,004

(22) Filed: Jul. 9, 2003

(51) Int. Cl.
*H04B 1/00* (2006.01)

(52) U.S. Cl. ........ 375/132; 375/133; 375/134; 375/135; 375/136; 370/330; 455/132; 455/161.1; 455/447

(58) Field of Classification Search .................. 370/343, 370/344, 480, 332, 334, 310, 328, 316, 330, 370/486, 535; 375/130–135, 137, 202, 345–347, 375/136, 140, 142, 145, 147, 149, 150, 340, 375/343, 362; 455/250.1, 251.1, 254, 239, 455/447
See application file for complete search history.

(56) References Cited

U.S. PATENT DOCUMENTS

| | | | | | |
|---|---|---|---|---|---|
| 4,383,323 | A | * | 5/1983 | Timor | 375/135 |
| 4,688,251 | A | * | 8/1987 | Citron et al. | 380/34 |
| 5,422,952 | A | | 6/1995 | Kennedy et al. | 380/23 |
| 5,625,641 | A | * | 4/1997 | Takakusaki | 375/137 |
| 5,781,582 | A | * | 7/1998 | Sage et al. | 375/134 |
| 5,832,026 | A | * | 11/1998 | Li | 375/136 |
| 6,275,518 | B1 | * | 8/2001 | Takahashi et al. | 375/135 |
| 6,320,896 | B1 | * | 11/2001 | Jovanovich et al. | 375/130 |

* cited by examiner

*Primary Examiner* — Sam K Ahn
*Assistant Examiner* — Sophia Vlahos
(74) *Attorney, Agent, or Firm* — Donna P. Suchy; Daniel M. Barbieri

(57) ABSTRACT

A method of receiving a plurality of simultaneously transmitted data streams is disclosed. Each data stream is divided into portions and transmitted at predetermined frequencies and times according to a frequency-hopping pattern. The portions are received using a plurality of receivers. Each receiver is configured to receive portions transmitted on one of the predetermined frequencies. The received portions are temporarily stored in a memory such that the received portions are stored as a function of receiver and time. The stored portions are compared to the frequency-hopping pattern. It is determined if any combination of the stored portions corresponds to the predetermined frequencies and times of the frequency-hopping pattern.

9 Claims, 4 Drawing Sheets

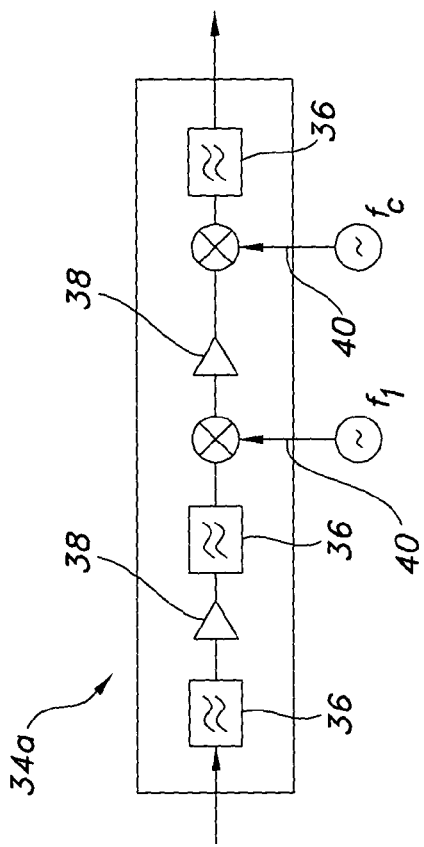
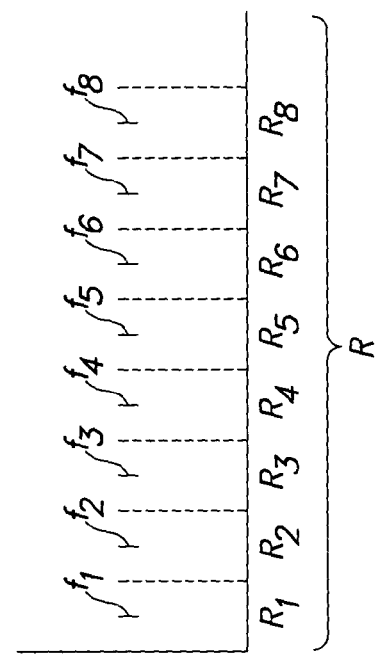
FIG. 3
FIG. 2

ARCHITECTURE FOR RECEIVING DATA FROM A MULTIPLICITY OF FREQUENCY HOPPING EMITTERS

FIELD OF THE INVENTION

The invention relates to electronic communications, and more particularly, to a system and method for receiving data streams from multiple frequency hopping transmitters.

BACKGROUND OF THE INVENTION

Frequency-hopping communication systems, which transmit portions of messages or data streams across multiple frequencies in a spectrum according to a predetermined pattern, are widely used in situations where secure communications are vital. Unless one knows the precise sequence and frequencies used by the system, it is very difficult to intercept a data stream so transmitted. Furthermore, because multiple frequencies are used to transmit a single data stream, the act of jamming or spoofing a frequency-hopped message can be very difficult.

There has been some effort in increasing the efficiency of frequency-hopping networks by simultaneously transmitting multiple messages or data streams across a specific frequency spectrum. Each message is transmitted using a given sequence of frequency and timing. To minimize the probability that portions of two messages are transmitted on the same frequency at the same time, one or more of the messages may be slightly delayed, or a different frequency-hopping pattern may be used.

One challenge of such a frequency-hopping system is that of receiving and re-assembling multiple messages. Known systems employ a single receiver dedicated to receiving each message or data stream that is being received. Each dedicated receiver requires expensive synchronization to ensure it is accurately and rapidly jumping from frequency to frequency according to the predetermined frequency-hopping pattern. When multiple data streams are concurrently transmitted according to the frequency-hopping pattern, a corresponding number of dedicated receivers are required to receive each data stream. The additional cost and space requirements due to adding dedicated receivers may adversely affect product design.

For security reasons, the predetermined frequency-hopping pattern may be changed as often as 10 milliseconds. Data streams transmitted from long distances, according to one frequency-hopping pattern, may not be received until after a new frequency-hopping pattern is initiated. Increasing the range of a frequency-hopping communications system has required either (1) using additional dedicated receivers configured to sense previously-used frequency-hopping patterns, or (2) increasing the time between changes of frequency-hopping patterns.

It is therefore an object of the invention to provide a frequency-hopping communications system that can inexpensively and efficiently process multiple data streams or messages.

It is a further object of the invention to provide a frequency-hopping communications system that may be used over long distances.

It is a further object of the invention to provide such a long-range system that can be configured to rapidly change the predetermined frequency-hopping pattern.

A feature of the invention is the use of multiple non-frequency-hopping receivers, where each receiver is configured to receive portions of any message—from a plurality of messages or data streams—that are transmitted on a given frequency.

Another feature of the invention is the extraction, from a memory, of message portions belonging to a common message, by comparing the message portions with the known frequency-hopping pattern.

An advantage of the invention is the reception of multiple data streams or messages, even from long-range transmitters, using inexpensive receivers.

SUMMARY OF THE INVENTION

The invention provides a method of receiving a plurality of simultaneously transmitted data streams, where each data stream is divided into portions and transmitted at predetermined frequencies and times according to a frequency-hopping pattern. According to the method, the portions are received using a plurality of receivers. Each receiver is configured to receive portions transmitted on one of the predetermined frequencies. The received portions are temporarily stored in a memory such that the received portions are stored as a function of receiver and time. The stored portions are compared to the frequency-hopping pattern. It is determined if any combination of the stored portions corresponds to the predetermined frequencies and times of the frequency-hopping pattern.

The invention also provides a method of receiving a plurality of concurrently transmitted data streams, wherein each data stream is divided into portions and transmitted on a plurality of frequencies according to a predetermined frequency-hopping pattern. According to the method, the portions are received using a plurality of receivers. Each receiver is configured to receive portions transmitted on one of the plurality of frequencies. The received portions are temporarily stored in a memory such that the received portions are stored as a function of receiver and time. The stored portions are compared to the predetermined frequency-hopping pattern. It is determined if any combination of the stored portions corresponds to the predetermined frequencies and times of the frequency-hopping pattern. The stored portions corresponding to the predetermined frequencies and times of the frequency-hopping pattern are extracted from the memory. A data stream is reassembled from the extracted portions.

The invention further provides a system for simultaneously receiving a plurality of data streams, where each data stream is divided into packets and where each of the packets is transmitted on one of a plurality of predetermined frequencies according to a predetermined frequency-hopping pattern. A plurality of receivers is provided, where each receiver is configured to receive signals across a frequency interval. Each frequency interval is non-overlapping and is selected to include one of the plurality of predetermined frequencies upon which packets are transmitted. The plurality of receivers cooperate to simultaneously receive packets from the plurality of data streams. A memory temporarily stores, as a function of receiver and time, packets received by the plurality of receivers. An analyzer compares the packets stored in the memory with the predetermined frequency-hopping pattern to determine whether any combination of the packets stored in memory were received according to the predetermined frequency-hopping pattern. Packets corresponding to one of the data streams are thereby identified. A signal processor extracts from the memory the identified packets, received according to the predetermined frequency-hopping pattern, and reassembles the data stream to which the identified packets correspond.

BRIEF DESCRIPTION OF THE DRAWINGS

FIG. 2 is an exemplary frequency distribution chart showing frequency assignments of the respective receivers according to the invention.

FIG. 3 is a detailed view of a single receiver used with the transceiver of FIG. 1.

DETAILED DESCRIPTION OF THE DRAWINGS

The invention is advantageously used in a frequency-hopping scheme, which involves partitioning a data stream or message into portions or packets, and then transmitting each packet on one of a predetermined number of set frequencies across a period of time in a known pattern. A receiver receives the packets and, knowing the frequency-hopping pattern, re-assembles the data stream or message.

Figure 1:
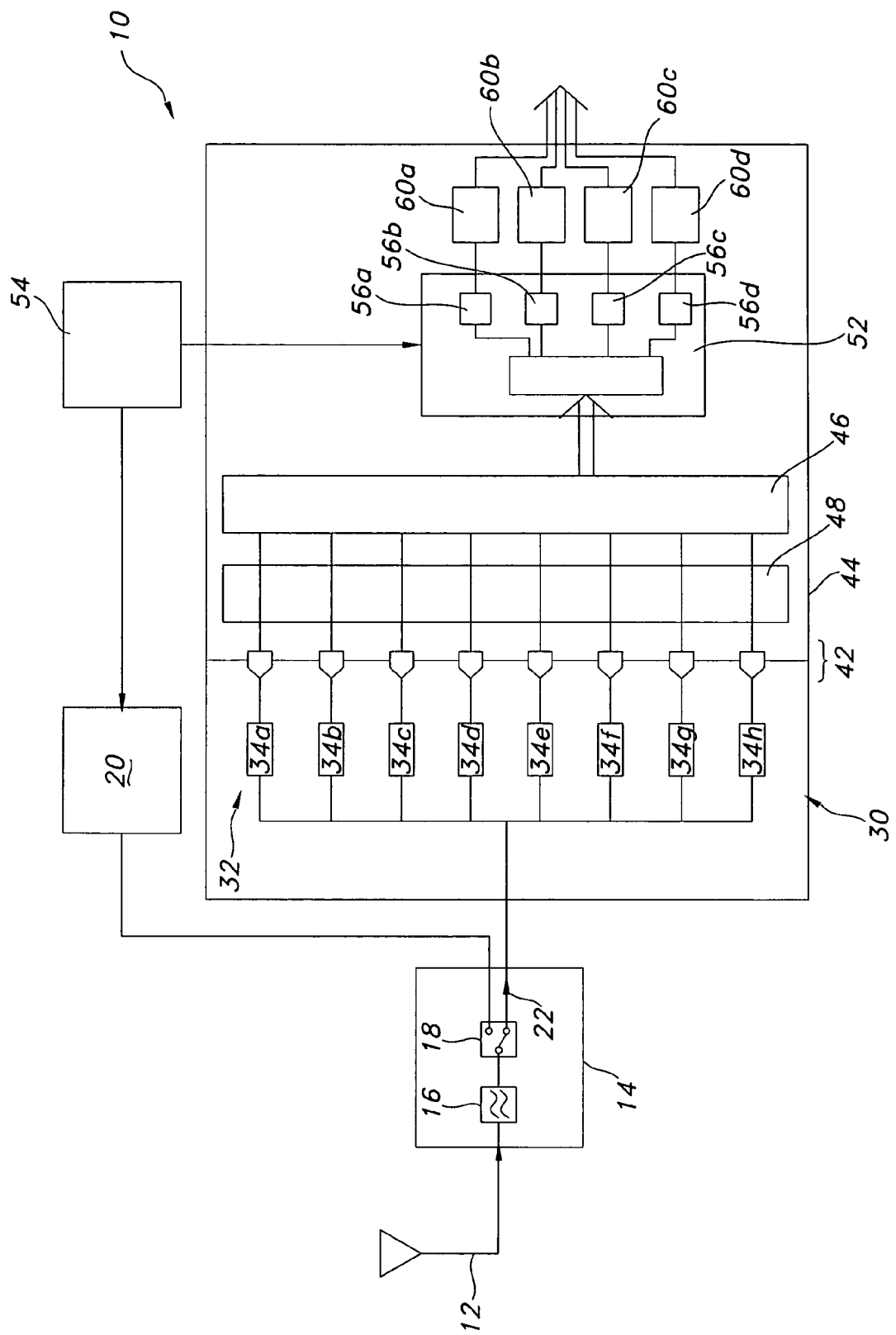
FIG. 1 is a schematic view of a frequency-hopping transceiver according to an embodiment of the invention.

FIG. 1 shows a schematic view of a transceiver apparatus 10 constructed according to the invention. Transceiver apparatus 10 includes an antenna 12, which is configured to send and receive signals over a range of frequencies. An antenna interface unit 14 is operationally connected to antenna 12. Antenna interface unit 14 includes a filter 16 to limit the range of frequencies over which the antenna is expected to be used. A transmit/receive control 18 switches use of the antenna between a transmit mode and a receive mode as required. Transmit/receive control 18 is operationally connected to an RF transmitter 20, which is configured to transmit on the predetermined frequencies used by a frequency-hopping algorithm.

Message packets received by antenna 12 are routed through a signal amplifier 22 to an analog processing unit 30. Analog processing unit 30 includes a receiver array 32 comprising a plurality of receivers 34a-34h. Each receiver is configured to receive a portion an overall frequency range used by the frequency-hopping algorithm. For example, an analog processing unit having eight receivers may enable an overall frequency range R (FIG. 2) to be divided into eight sub-ranges R1-R8. Each sub-range is preferably selected such that one of the frequencies f1-f8 upon which the frequency-hopping scheme is to operate is centered on a corresponding sub-range R1-R8.

Receiver 34a, as shown in FIG. 3, includes circuitry such as filters 36 and amplifiers 38 that are required to accurately receive message packets on one of the predetermined frequencies. Receiver 34a also includes an input 40 of frequency f1 and an input 41 for a carrier frequency fc to accomplish frequency translation and carrier modulation, respectively, as is known in the art. Receivers 34b-34h are configured similarly to receiver 34a and include inputs of frequencies f2-f8 at their respective inputs 40. In this manner each receiver 34a-34h is configured to receive message packets on one of the frequencies f1-f8 upon which the frequency-hopping scheme is to operate.

The message packets received by each receiver 34a-34f are converted into digital form by a bank of analog-to-digital converters (ADC) 42, and are sent to a digital processing unit 44. Digital processing unit 44 includes a memory 46 and programmable circuitry that may include field-programmable gate array units (FPGAs), application-specific integrated circuits (ASICs), or other types of circuitry. In the present embodiment a first FPGA 48 performs further digital processing on each of the digitized message packets, such as digital down-conversion, I/Q separation and channel separation, to enable multiple channels on each frequency to transmit packets. For the sake of simplicity, these operations (and the multiple channels associated therewith) are not depicted in the Figures, but are presumed to be within the scope of the invention.

Figure 4:
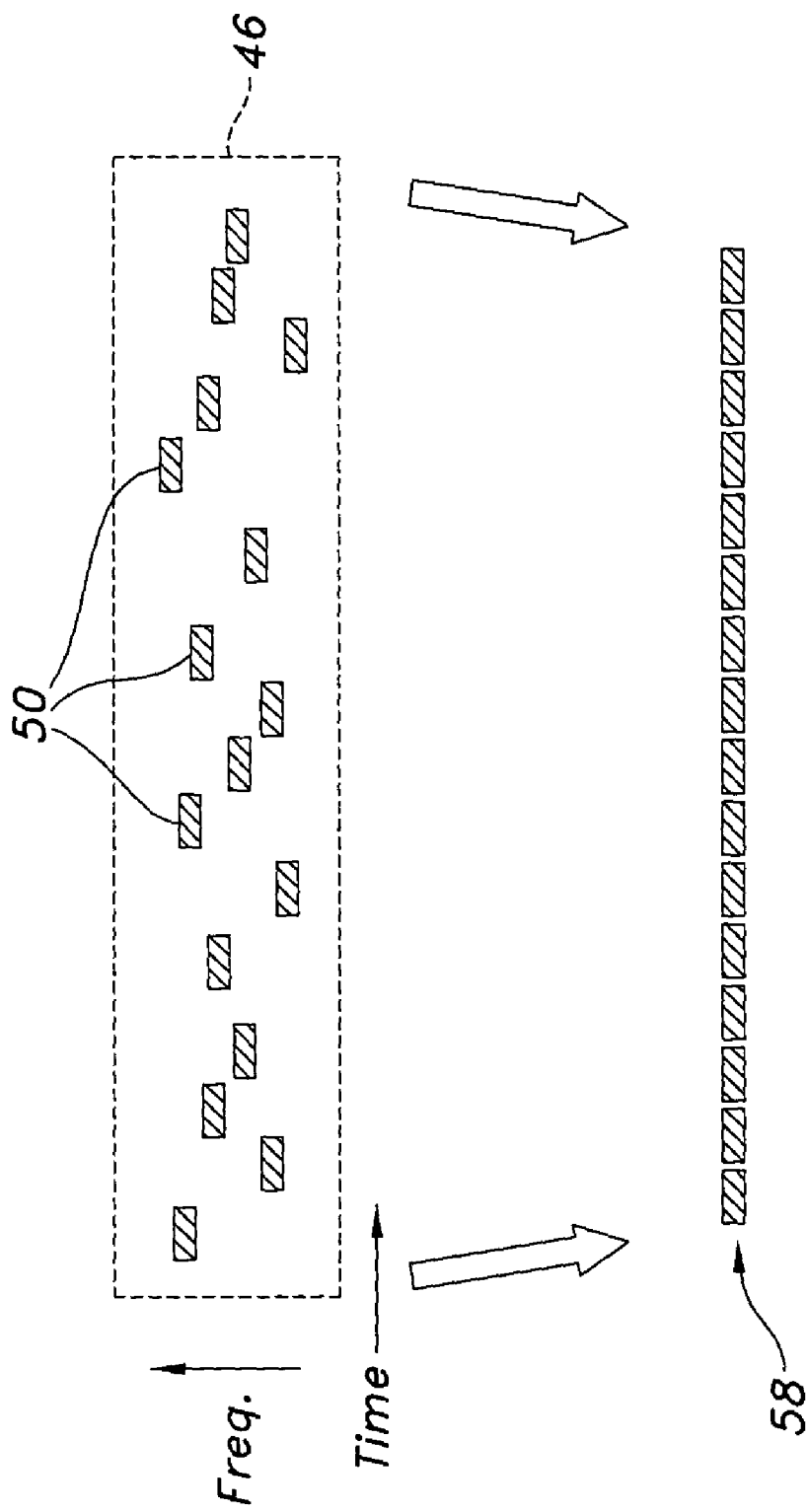
FIG. 4 is a schematic of the distribution of message packets, from a single data stream, in a memory according to the invention.

After the desired digital processing, the message packets are stored in memory 46 so that each message packet is identifiable by (a) which receiver received the message packet, and (b) the time the message packet was received. FIG. 4 shows a graphical representation of the contents of memory 46, in which a plurality of packets 50, corresponding to a single data stream or message, are stored by frequency received and the time received. Although message packets 50 are shown to have substantially the same lengths and are received in a substantially regular sequence, the frequency-hopping pattern employed by the invention may include message packets of varying lengths separated by varying gaps in time.

A second FPGA 52 reads message packets 50 from memory 46 and compares the frequency and timing of the reception of the message packets with the known frequency-hopping pattern. A frequency-hopping pattern generator 54 provides second FPGA 52 with the known frequency-hopping pattern, which may be programmed to change from time to time. If there is sufficient correlation between the known frequency-hopping pattern and the frequency and timing of the received message packets, it is determined that the packets corresponding to the known pattern form a single message 58 (FIG. 4). A signal processing module 56a, included within second FPGA 52, assembles the message from the packets in the order in which the packets were received. Circuitry within digital processing unit 44, such as ASIC 60a, may be included to further process single message 58 using known error correction, decryption/decoding, or other message analysis algorithms.

Figure 5:
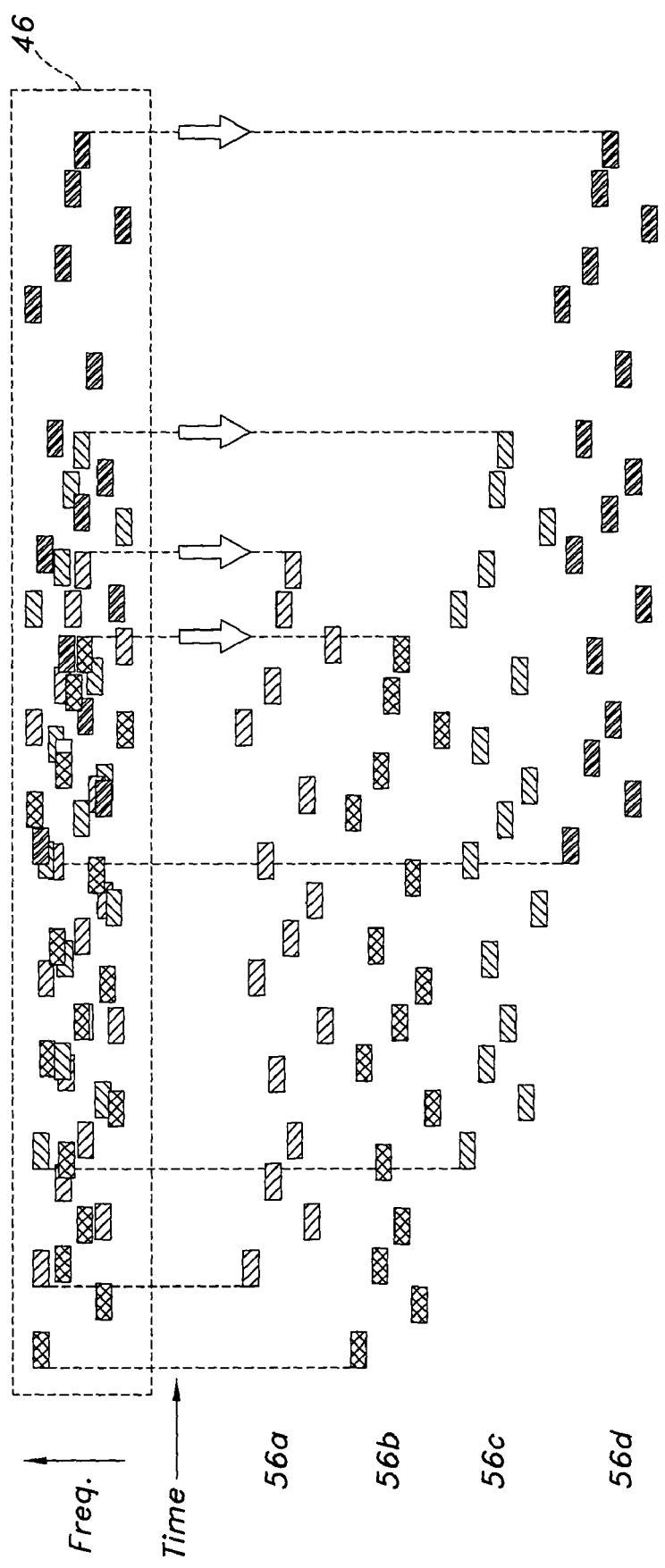
FIG. 5 is a schematic view of the distribution of message packets, from a plurality of data streams, in a memory according to the invention.

FIG. 4 depicts the contents of memory 46 where packets from a single incoming message are stored. To maximize throughput in the frequency-hopping spectrum, the invention may simultaneously receive, store, process, and extract packets from multiple data streams or messages. FIG. 5 shows four messages, with corresponding packets differently shaded, stored in memory 46. Additional signal processing modules 56b-56d may be used to simultaneously re-assemble each message from its respective packets. Additional circuitry, such as ASICs 60b-60d, are also provided to further process the messages as previously described with respect to ASIC 60a.

Memory 46 should have sufficient capacity to store incoming messages long enough for second FPGA 52 to (a) read the memory, (b) compare the sequence of the packets to the known frequency-hopping pattern, (c) determine if a message has been received according to the known pattern, and (d) send the message packets to one of signal processing modules 56a-56d. It has been determined 2 milliseconds is sufficient time to perform these functions for a message divided into sixteen packets with each packet lasting (on average) 60 microseconds and approximately 960 microseconds being therefore necessary to transmit all packets of a message. Memory capacity may be raised or lowered depending on other processing considerations.

It may not be necessary to analyze every packet stored in memory 46 to determine a correlation between the sequence of packets in the memory and the known frequency-hopping pattern. It may be sufficient to determine a correlation between the known pattern and less than half of the packets in a message, and then to extract packets in any memory space that would correspond to the known pattern.

The invention is designed to be used with a frequency-hopping system that can periodically change the known frequency-hopping pattern. To compensate for delays due to distant transmitters, second FPGA 52 may compare the contents of memory 46 to a new frequency-hopping pattern as well as to one or more previous frequency-hopping patterns. If the new frequency-hopping pattern requires any of the receivers to receive signals on new frequencies, the receivers are fed, through the respective inputs, the new frequencies as dictated by the new pattern.

For convenience the sub-ranges are depicted as completely spanning the overall frequency range; however, overall frequency range may be large enough so that the sub-ranges may be non-contiguous across the overall frequency range. In such an embodiment, frequencies f1-f8 may be selected from a larger number of possible frequencies during frequency hopping.

The invention therefore provides an inexpensive alternative to known frequency-hopping communications systems. Instead of dedicating a receiver to each data stream and requiring each receiver to quickly hop along with the frequency-hopping pattern, the invention dedicates a receiver to each frequency and reassembles each data stream by matching sequences of stored packets with the frequency-hopping pattern.

Another advantage of the invention is that it can be effectively receive data streams from distant transmitters. By matching sequences of stored packets with previously-employed frequency-hopping patterns, the range of the receiver is increased.

Still another advantage of the invention is that costly receivers, dedicated to an anticipated data stream, are not required to be added when increased traffic is anticipated on the communications system. Instead, digital processing unit 44 may be configured to accommodate the increased traffic.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of receiving a plurality of simultaneously transmitted data streams, wherein each of the data streams is divided into portions and transmitted at predetermined frequencies and times according to a frequency-hopping pattern, the method comprising:
   receiving the portions using a plurality of receivers, where each of the plurality of receivers is configured to receive portions transmitted on one of the predetermined frequencies;
   temporarily storing the received portions in a memory such that the received portions are stored as a function of receiver and time;
   comparing the stored portions to the frequency-hopping pattern;
   determining if any combination of the stored portions corresponds to the predetermined frequencies and times of the frequency-hopping pattern;
   wherein each of the predetermined frequencies includes a plurality of discrete channels configured for data transmission thereon, wherein portions of a data stream are transmitted on any of the plurality of channels according to the frequency-hopping pattern, the method further including;
   processing signals received by each of the plurality of receivers to separate the plurality of channels;
   temporarily storing the received portions in the memory such that the received portions are stored as a function of channel and time;
   said frequency-hopping pattern is a single pattern which is common to and applied across all of said plurality of receivers;
   wherein the frequency-hopping pattern is a current frequency-hopping pattern, and further comprising:
   changing from the current frequency-hopping pattern to a new frequency-hopping pattern;
   comparing the stored portions, as the function of receiver and time, to the current frequency-hopping pattern and the new frequency-hopping pattern; and
   determining if any combination of the stored portions corresponds to the predetermined frequencies and times of one of the current frequency-hopping pattern and the new frequency-hopping pattern.

2. The method of claim 1, further comprising:
   extracting from the memory the stored portions corresponding to the plurality of frequencies of the frequency-hopping pattern; and
   reassembling a data stream from the extracted portions.

3. The method of claim 1, further comprising:
   reconfiguring each of the plurality of receivers to receive a frequency according to the new frequency-hopping pattern.

4. A method of receiving a plurality of concurrently transmitted data streams, wherein each of the data streams is divided into portions and transmitted on a plurality of frequencies according to a predetermined frequency-hopping pattern, the method comprising:
   receiving the portions using a plurality of receivers, where each of the plurality of receivers is configured to receive portions transmitted on one of the plurality of frequencies;
   temporarily storing the received portions in a memory such that the received portions are stored as a function of receiver and time;

comparing the stored portions to the predetermined frequency-hopping pattern;
determining if any combination of the stored portions corresponds to the plurality of frequencies of the predetermined frequency-hopping pattern;
extracting from the memory the stored portions corresponding to the plurality of frequencies of the predetermined frequency-hopping pattern; and
reassembling a data stream from the extracted portions;
wherein each of the predetermined frequencies includes a plurality of discrete channels configured for data transmission thereon, wherein portions of a data stream are transmitted on any of the plurality of channels according to the predetermined frequency-hopping pattern, the method further including:
processing signals received by each of the plurality of receivers to separate the plurality of channels;
temporarily storing the received portions in the memory such that the received portions are stored as a function of channel and time;
said predetermined frequency-hopping pattern is a single pattern which is common to and applied across all of said plurality of receivers;
wherein the predetermined frequency-hopping pattern is a current frequency-hopping pattern, and further comprising:
periodically changing from the current frequency-hopping pattern to a new frequency-hopping pattern;
comparing the stored portions, as the function of receiver and time, to the current frequency-hopping pattern and the new frequency-hopping pattern; and
determining if any combination of the stored portions corresponds to the plurality of frequencies of one of the current frequency-hopping pattern and the new frequency-hopping pattern.

5. The method of claim 4, further comprising:
reconfiguring each of the plurality of receivers to receive a frequency according to the new frequency-hopping pattern.

6. A system for simultaneously receiving a plurality of data streams, where each of the data streams is divided into packets and where each of the packets is transmitted on one of a plurality of predetermined frequencies according to a predetermined frequency-hopping pattern, the system comprising:
a plurality of receivers, each of the plurality of receivers configured to receive signals across a frequency interval, where each frequency interval is non-overlapping and is selected to include one of the plurality of predetermined frequencies upon which packets are transmitted, wherein the plurality of receivers cooperate to simultaneously receive packets from the plurality of data streams;
a memory for temporarily storing, as a function of receiver and time, packets received by the plurality of receivers;
a plurality of analyzers that compare the packets stored in the memory with the predetermined frequency-hopping pattern to determine whether any combination of the packets stored in memory were received according to the predetermined frequency-hopping pattern, thereby identifying packets corresponding to one of the data streams;
a signal processor that extracts from the memory the identified packets, received according to the predetermined frequency-hopping pattern, and reassembles the data stream to which the identified packets correspond;
said predetermined frequency-hopping pattern is a single pattern which is common to and applied across all of said plurality of receivers; and
wherein the predetermined frequency-hopping pattern is a current frequency-hopping pattern, and further comprising a frequency-hopping pattern generator that generates a new frequency-hopping pattern, wherein the plurality of analyzers compare the packets stored in memory with the current frequency-hopping pattern and the new frequency-hopping pattern to determine whether any combination of the packets stored in memory were received according to one of the current frequency-hopping pattern and the new frequency-hopping pattern.

7. The system of claim 6, further including an antenna configured to selectively and alternately transmit and receive data streams on the plurality of predetermined frequencies according to the predetermined frequency-hopping pattern.

8. The system of claim 6, wherein the plurality of analyzers are resident on one of a field-programmable gate array and an application-specific integrated circuit.

9. The system of claim 6, wherein the signal processor is a first signal processor, and further comprising a second signal processor that extracts, from at least one of the plurality of predetermined frequencies, a plurality of discrete transmitting channels, wherein the packets are configured to be transmitted and received on any of the channels according to the predetermined frequency-hopping pattern, and further wherein the memory is configured to temporarily store, as a function of channel and time, packets received by the plurality of receivers.

* * * * *